United States Patent
Becker et al.

(10) Patent No.: US 6,392,675 B1
(45) Date of Patent: May 21, 2002

(54) VARIABLE SPEED CURSOR MOVEMENT

(75) Inventors: Craig Henry Becker, Austin, TX (US); Michael David Hocker, Staatsburg, NY (US); James Gordon McLean, Fuquay-Varina, NC (US); Clifford Alan Pickover, Yorktown Heights, NY (US); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/256,195

(22) Filed: Feb. 24, 1999

(51) Int. Cl.$^7$ .................................................. G09G 5/08
(52) U.S. Cl. ........................ 345/858; 345/856; 345/862
(58) Field of Search ................................ 345/856, 858, 345/859, 861, 862, 156, 157, 701, 702, 145

(56) References Cited

U.S. PATENT DOCUMENTS

| | | | | |
|---|---|---|---|---|
| 4,866,602 A | | 9/1989 | Hall ............................ 364/200 |
| 5,146,212 A | * | 9/1992 | Venolia ....................... 345/145 |
| 5,153,571 A | | 10/1992 | Takahashi ................... 340/710 |
| 5,195,179 A | * | 3/1993 | Tokunaga .................... 345/159 |
| 5,287,448 A | | 2/1994 | Nicol et al. .................. 395/159 |
| 5,313,229 A | | 5/1994 | Gilligan et al. ............. 345/157 |
| 5,561,758 A | | 10/1996 | Hocker et al. .............. 395/159 |
| 5,790,102 A | | 8/1998 | Nassimi ...................... 395/163 |
| 5,831,597 A | | 11/1998 | West et al. .................. 345/163 |
| 6,025,833 A | * | 2/2000 | Duff ............................ 345/159 |
| 6,025,844 A | * | 2/2000 | Parsons ....................... 345/357 |
| 6,137,487 A | * | 10/2000 | Mantha ....................... 345/333 |
| 6,219,034 B1 | * | 4/2001 | Elbing et al. ............... 345/158 |
| 6,252,579 B1 | * | 6/2001 | Rosenberg et al. ......... 345/145 |

FOREIGN PATENT DOCUMENTS

| | | | | |
|---|---|---|---|---|
| JP | 03-48922 | 3/1991 | | G06F/3/033 |
| JP | 06-119137 | 4/1994 | | G06F/3/14 |

* cited by examiner

*Primary Examiner*—Kent Chang
(74) *Attorney, Agent, or Firm*—John H. Holcombe

(57) ABSTRACT

A method, a front-of-screen graphical display system, and a computer program product for controlling the speed sensitivity of a GUI cursor. GUI objects, such as icons, occupy predetermined areas of the display. First and second preselected velocity settings are provided for the cursor. A determination is made whether the cursor is located within one of the object areas of the display. If, 1) the cursor is located outside one of the object areas, the speed sensitivity for movement of the cursor by the mouse is directly related to the first preselected velocity setting. If, 2) the cursor is located within one of the object areas, the speed sensitivity for movement of the cursor is directly related to the second preselected velocity setting. The second setting is the same as or slower than the first. Thus, outside the bounds of the object area, such as between objects, movement of the mouse moves the cursor at a first velocity, and, within the bounds of the object area, the same movement of the mouse moves the cursor at a second, slower velocity.

6 Claims, 4 Drawing Sheets

VARIABLE SPEED CURSOR MOVEMENT

TECHNICAL FIELD

This invention relates to front-of-screen graphical display systems having a cursor, such as a workstation, personal computer or terminal display, and, more particularly, to control over the movement of the cursor on the display screen.

BACKGROUND OF THE INVENTION

Front-of-screen graphical display systems which utilize graphical user interfaces (GUI's) having a cursor on a display screen, which a user may move and reposition by means of a cursor movement interface, such as a computer mouse, are well known in the art, and are becoming commonplace. Examples include those provided by various Microsoft "WINDOWS" operating systems, and the IBM "OS/2" operating system, for workstations and personal computers.

In the most common arrangement, a computer mouse is coupled to the computer system and may be moved by the user on a mouse pad, and the operating system will cause the cursor on the display screen to move in a corresponding direction. Typically, the user employs the mouse to move and reposition the cursor between objects, such as between windows, between arrays of toolbars, between 3-D elements, and between icons. Such operating systems also allow the user to select a speed at which the cursor is moved in response to movement of the mouse. For example, the Microsoft "WINDOWS 95" operating system "SETTINGS", "CONTROL PANEL", "MOUSE" allows the speed of the cursor, or "POINTER" to be set by a user. With the complexity of the GUI display screen populated by text, drawings, icons and toolbars, negotiation of the screen can sometimes be difficult. Thus, the user must choose a compromise speed that will allow both some speed of movement and some degree of precision in stopping the cursor at a desired point.

As the result, it would be desirable to vary the speed of the cursor according to different circumstances. For example, when moving the cursor across a large distance, it would be helpful to be able to do so at a high rate of speed. However, when the cursor is being moved into a precise position, such as to a particular front-of-screen icon, or a front-of-screen toolbar, to select the toolbar or to activate an icon, it would be desirable to have a slower rate of motion to properly position the cursor and insure selection or activation of the correct icon or toolbar.

This need has been reflected in devices which allow some speed variation to occur by providing a variation in the mouse output to the computer system. For example, U.S. Pat. No. 5,790,102, Nassimi, issued Aug. 4, 1998, describes a computer mouse that is pressure sensitive and provides signals to the computer system that is proportional to the pressure exerted on the mouse by the user and to the speed of movement of the mouse. In another example, U.S. Pat. No. 5,153,571, Takahashi, issued Oct. 6, 1992, describes an input device interposed between a mouse and the computer system which counts the output pulses of the mouse and which varies the counts provided to the computer system as set by a push-button switch.

Such devices are high cost, as compared to the cost of a conventional mouse, and require the user to operate the mouse in a special way to accomplish the speed variations. The operation, for example, of an added switch, to control the speed is also inconvenient for the typical user. Thus, such devices tend to be counterproductive and do not aid navigation of the GUI.

SUMMARY OF THE INVENTION

It is an object of the present invention to provide variable speed cursor movement which is convenient to the user of the mouse or other cursor movement interfaces.

It is another object of the present invention to allow the user to set the speeds of the cursor movement.

Disclosed are a method, a front-of-screen graphical display system, and a computer program product for controlling the speed sensitivity of a GUI cursor. The GUI objects on the front-of-screen display, such as icons, occupy predetermined areas of the display, and the graphical method for controlling movement of the displayed cursor in response to the cursor movement interface, or mouse, comprises the steps of:

providing a first preselected velocity setting for the cursor;

providing a second preselected velocity setting for the cursor;

determining whether the cursor is located within one of the predetermined object areas of the display; and responding to the cursor movement interface and to the determining step to move the cursor at the display at a speed sensitivity with respect the mouse, 1) if the cursor is located outside one of the predetermined object areas, directly related to the first preselected velocity setting, and, 2) if the cursor is located within one of the predetermined object areas, directly related to the second preselected velocity setting.

Thus, outside the bounds of the object area, movement of the mouse moves the cursor at a first speed, and, within the bounds of the object area, the same movement of the mouse moves the cursor at a second speed. In one embodiment, the second preselected velocity ($V_2$) is a ratio $1/n$ to the first preselected velocity ($V_1$). The ratio cannot exceed unity, so that the speed sensitivity of the cursor within an object area is the same or less than that outside the object area. The objects can therefore be considered as "gravity wells", slowing the speed of the cursor. Specifically, ($V_1$) may comprise a binary number and (n) may comprise a power of 2, so that movement of the cursor within the predetermined object areas is calculated by means of a binary bit shift of ($V_1$).

In accordance with another aspect of the invention, if a button on the mouse is activated, for example, to drag an icon, the second velocity setting is overridden in areas where the icon cannot be validly dropped, and the icon is dragged at the higher speed in these areas.

The variable speed cursor is independent of the mouse or other cursor movement interface, and, therefore, does not add to the cost of the mouse or other cursor movement interface. It is implementable as a computer program product which may be incorporated within or added to the operating system of the GUI computer system.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
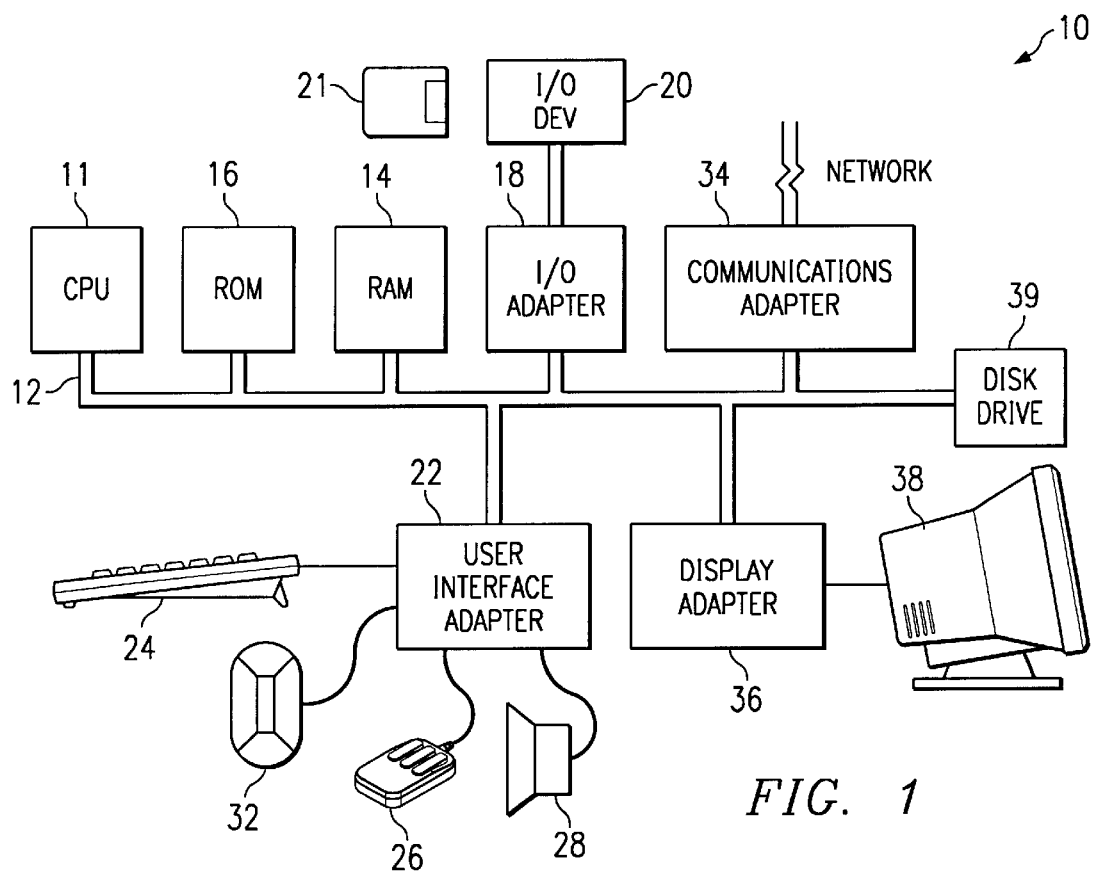
FIG. 1 is a block diagram of an exemplary computer system for implementing the present invention.
Figure 2:
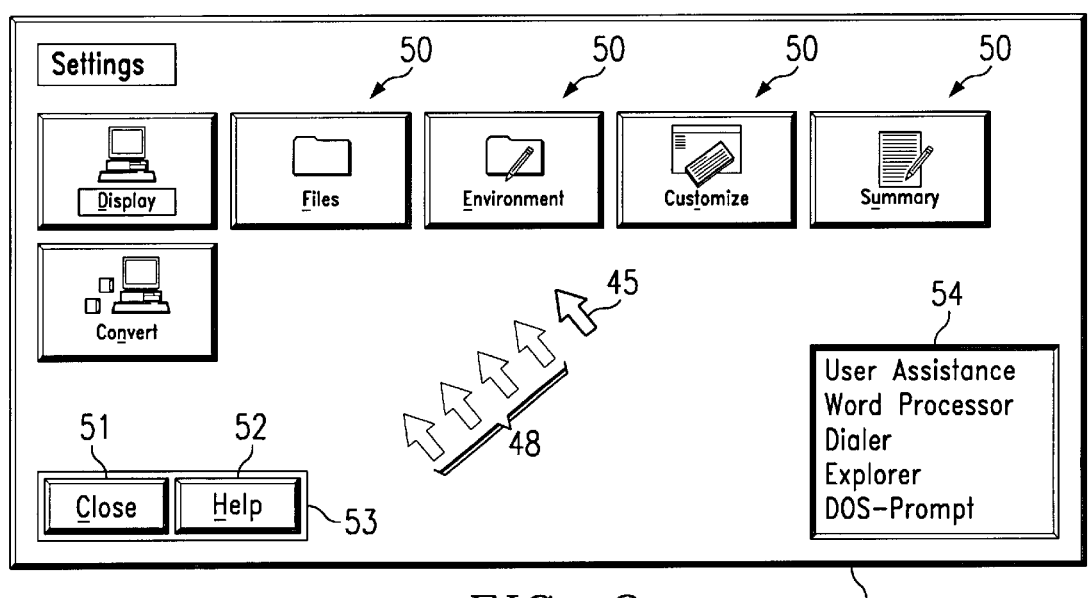
FIG. 2 is a pictorial representation of a front-of-screen at which the cursor movement of the present invention may be visualized.
Figure 3:
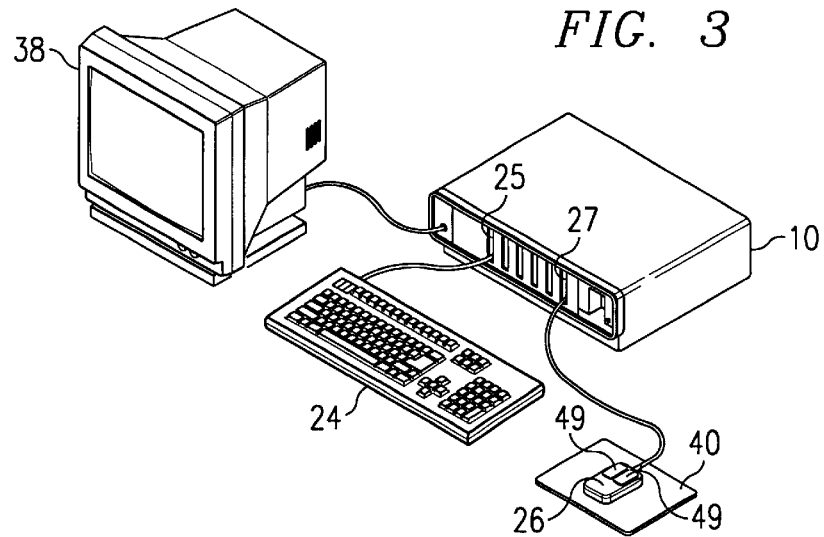
FIG. 3 is an isometric illustration of the exemplary computer system of FIG. 1.

Referring to FIGS. 1, 2 and 3, a typical hardware configuration of a workstation is illustrated, having a computer 10 with a central processing unit 11, such as a conventional microprocessor, and a number of other units interconnected via a system bus 12. The workstation includes, for example, a random access memory 14, a read only memory 16, and an I/O adapter 18 for connecting peripheral input/output devices 20, such as floppy drives, tape drives, CD-ROM drives, etc., to the bus 12. The input/output device 20 reads a data storage medium 21, such as a floppy disk, tape cartridge, CD-ROM, etc. A user interface adapter 22, typically connected to a keyboard 24 at keyboard port 25, and to a cursor movement interface 26, such as a mouse or a computer pointer tracking device, at mouse port 27, communicates with the bus 12. The user interface adapter may additionally connect a speaker 28 and microphone 32, to the bus 12. A communication adapter 34 connects the workstation to a data processing network, such as a LAN, and a display adapter 36 connects the bus to a display device 38.

The computer 10 is typically operated by means of a operating system program and supported applications, which are computer program products primarily stored in a disk drive 39. Examples of operating systems include various Microsoft "WINDOWS" operating systems, the IBM "OS/2" operating system, and the Sun Microsystems "SOLARIS" operating system, for workstations and personal computers. The computer readable program code of a computer program product(s) may be supplied at the I/O device 20 from storage medium 21 which stores executable computer instructions. The illustrated example of a storage medium 21, which is an article of manufacture, is a magnetic diskette. Other suitable storage media are optical disk cartridges, magnetic tape cartridges, removable hard disk cartridges, read only memories (ROM) or programmable read only memories (PROM). The requirement for the storage media or memories is that they store digital representations of computer executable instructions. The computer program product may alternatively be supplied electronically, as from a network at the communications adapter 34.

The mouse 26 is typically moved by an operator in various directions and at various speeds across a mouse pad 40 to control corresponding movement of a cursor 45 on front-of-screen display 46 of display device 38. The immediate past path of cursor 45 may be identified by "pointer trails" 48.

The user typically employs the mouse 26 to move the cursor 45 between objects, such as icons, and "clicks" one of buttons 49 to select the operation depicted by a selected one of the icons, such as icons 50. Additionally, while depressing one of buttons 49, the user may "drag" an icon 50 to a different location. In order to activate or drag the icon 50, the cursor must be within an active area of the icon, often called an "icon box", and defined herein as the "icon area". For the purpose of the present invention, the terms "object area", "icon" and "icon area" may include not only true "icons" 50 with pictographic or graphic symbols, but also text within a predefined active area, such as elements 51 and 52. As will be seen, the term "object area" includes three-dimensional volumes. Alternatively, an "object area" as defined herein, may comprise a grouping of icons in a common "toolbar" 53 or a file selection screen 54.

As described above, it would be desirable to vary the speed of the cursor according to different circumstances. In accordance with the present invention, the user, when moving the cursor across a large distance, does so at a high rate of speed using the mouse 26. However, when the cursor 45 is being moved into an object area, such as front-of-screen icon 50, or a front-of-screen toolbar 53, to select the icon or an icon of the toolbar, the same movement of the mouse 26 produces a slower rate of motion of the cursor 45 to properly position the cursor and insure selection or activation of the correct icon.

Figure 4:
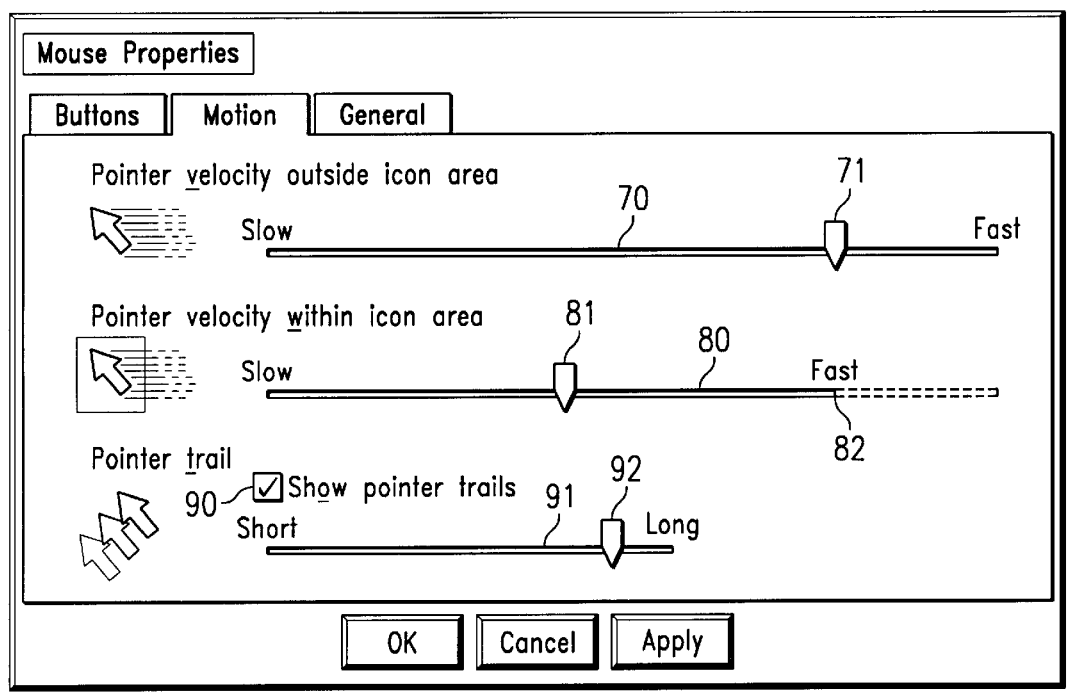
FIG. 4 is a pictorial representation of an embodiment of a front-of-screen display at which an operator may adjust the cursor velocities in accordance with the present invention.
Figure 5:
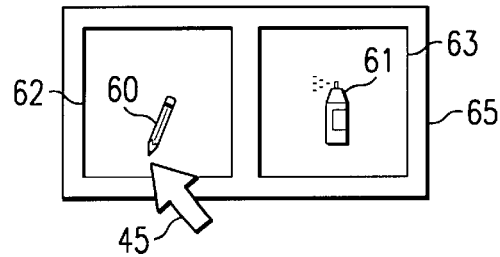
FIG. 5 is a pictorial representation of exemplary object areas and a cursor on a front-of-screen display.

Referring to FIGS. 4 and 5, icons 60 and 61 are each respectively located within object areas 62 and 63. Again, alternatively, the object area may comprise the toolbar 65. Thus, in accordance with the present invention, when the cursor 45 is located within object area 62, the speed of movement of the cursor is slowed, allowing the user greater precision in stopping the movement of the cursor to select or drag the icon 60. The object areas can therefore be considered as a "gravity wells", slowing the speed of the cursor. If the user wished, instead, to select icon 61, the slower speed of the cursor within the object areas 62 and 63 allows the user the greater precision of selecting the desired icon. Similarly, if the object area is the toolbar 65, when the user is moving the cursor 45 within the toolbar 65, the slower speed of the cursor provides the user with greater precision in selecting the desired icon.

Also in accordance with the present invention, the user may select the relative speed sensitivities of the cursor, for example, by using the "Mouse Properties" window display of FIG. 4. The typical bar 70 and marker 71 of prior mouse motion control as depicted in FIG. 4 which allows the user to select a speed at which the cursor is moved in response to movement of the mouse, is, in accordance with the invention, employed to select a first preselected cursor velocity ($V_1$) outside the object area. An additional bar 80 and marker 81 are provided to allow the user to select a second preselected cursor velocity ($V_2$) within the object area. To insure that the velocity within the object area is not selected to be greater than that outside the object area, the bar 80 may be shortened by movement of end 82 commensurate with the marker 71 to provide a visual indication to that effect.

The typical computer system additionally comprises pointer trails for following movement of the cursor, and may have a box 90 where the user may select the pointer trail and a bar 91 and marker 92 where the user may select whether the marker trails are short or long. In accordance with the present invention, the pointer trails are displayed at substantially the identical speed as the movement of the cursor outside and within the object areas.

Figure 6:
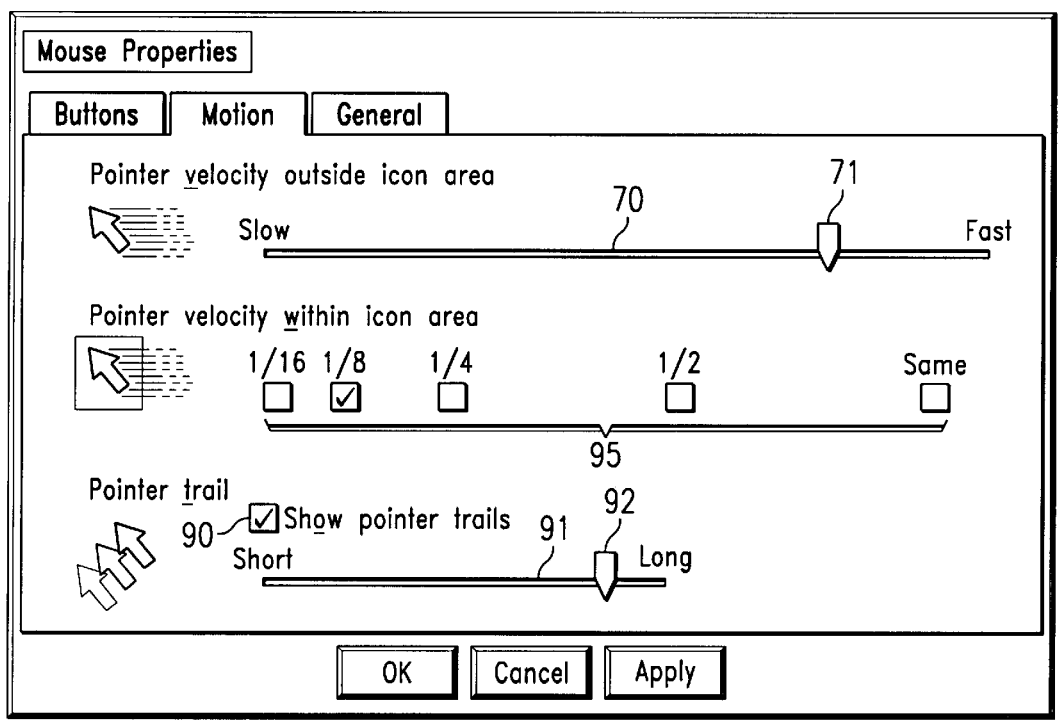
FIG. 6 is a pictorial representation of an alternative embodiment of a front-of-screen display at which an operator may adjust the cursor velocities in accordance with the present invention.

An alternative arrangement of the "Mouse Properties" window display is depicted in FIG. 6. Rather than a bar and sliding marker, the user selection of the pointer velocity within the object area may instead comprise a selection of one of several provided boxes 95. Additionally, the choices of the boxes may be arranged in accordance with another aspect of the present invention so that the second preselected velocity ($V_2$) is a ratio 1/n to the first preselected velocity ($V_1$). The ratio thus becomes ($V_2=V_1/n$). In accordance with the present invention, the ratio cannot exceed unity, so that the speed sensitivity of the cursor within an object area is the same or less than that outside the object area. Specifically, to allow ease of calculation, ($V_1$) comprises a binary number and (n) comprises a power of 2, so that movement of the cursor within the predetermined object areas is calculated by means of a binary bit shift of ($V_1$).

Further in accordance with the present invention, when one of the buttons of the mouse is depressed while the cursor is in the object area, and the mouse is moved (e.g., so as to drag an icon), the second selected speed is overridden in areas where the object cannot be validly dropped so that the cursor and object are dragged at the first preselected speed as though it were outside the object areas. Alternative "drag" operations not requiring depression of a button will similarly move the object at the first preselected speed sensitivity in areas where the object cannot be validly dropped. Examples of invalid drop areas are on top of an icon or toolbar.

Figure 7:
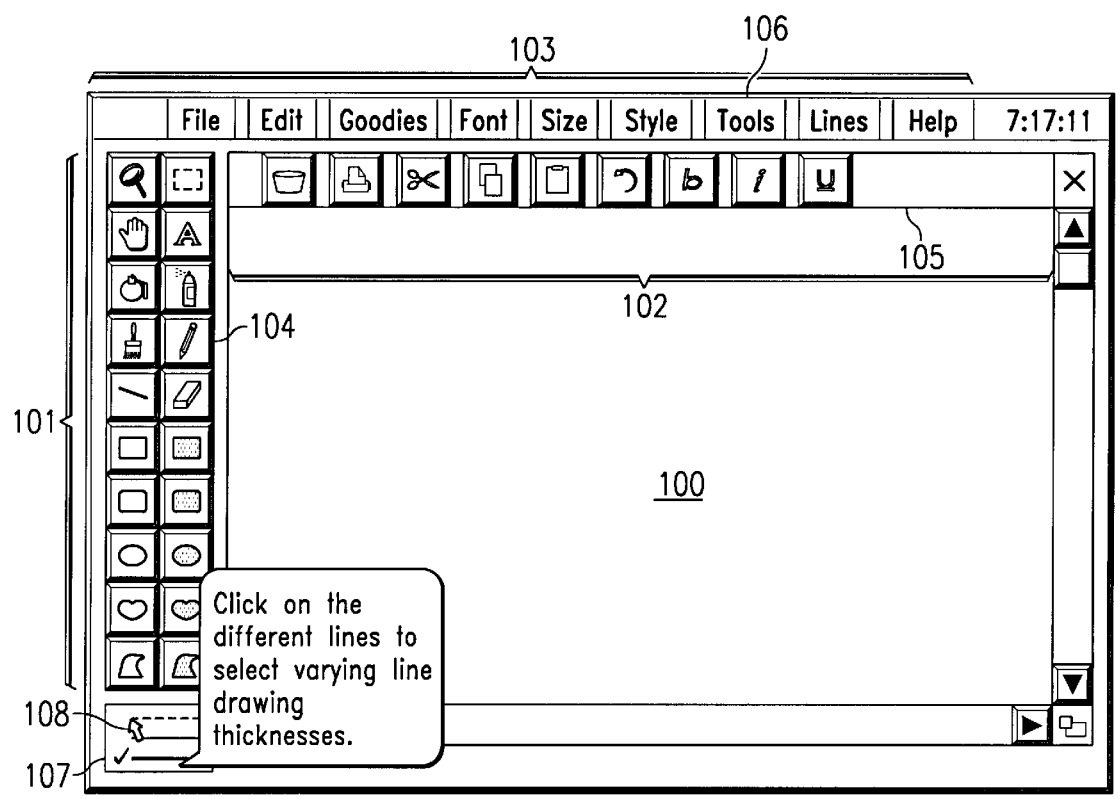
FIG. 7 is another pictorial representation of a front-of-screen at which the cursor movement of the present invention may be visualized.
Figure 8:
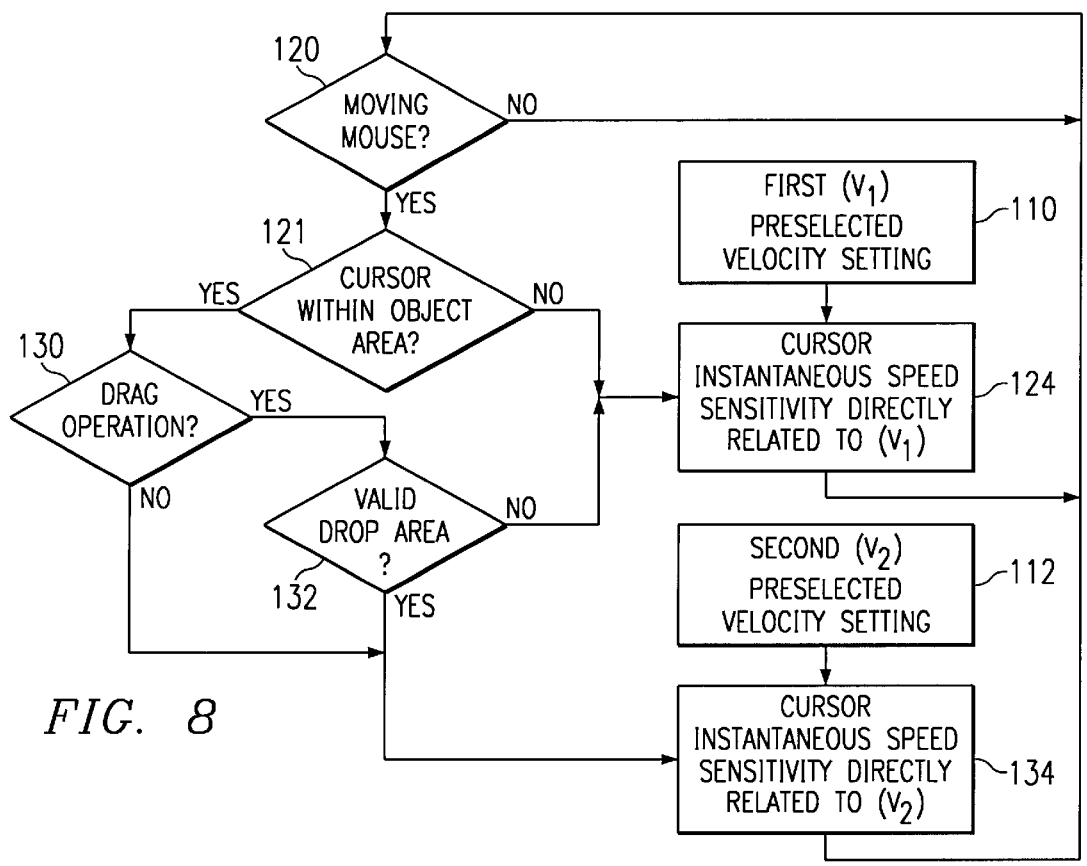
FIG. 8 is a flow chart depicting an embodiment of the method of the present invention.

Referring to FIGS. 7 and 8, an embodiment of the method of the present invention will be discussed. FIG. 7 depicts an example of a front-of-screen display having an open area 100 (which may be occupied by text, etc.) and a plurality of toolbars 101, 102 and 103, having the respective object areas 104, 105 and 106 for icons or text. An icon with an object area 107 is also illustrated. A cursor 108 is depicted as within object area 107.

In FIG. 8, the method of the present invention is always active, and is advantageously incorporated within the operating system of the computer. In one embodiment, the invention comprises a computer program product in the form of computer readable program code. Additionally referring to FIG. 1, the computer program product may be supplied at the I/O device 20 from storage medium 21 which stores executable computer instructions, or may be supplied over the network at communications adapter 34, and the computer program product is stored in storage 39 or RAM 16 and will operate the computer 10 to perform the method of the invention.

Step 110 detects the first preselected velocity setting ($V_1$) as selected by the user. Step 110 may be a process from the operating system for controlling the cursor motion. Step 112 is an added step in accordance with the present invention, providing the second preselected velocity setting ($V_2$) selected by the user. In the absence of a selection by the user, both or either ($V_1$) and ($V_2$) will be provided by the program as default values from stored default settings stored with the program, e.g., at storage 39 or RAM 16 in FIG. 1. As an example, the default ratio between the settings will be 1/8.

In step 120, the computer determines whether the cursor movement interface or mouse is motionless or is moving. If motionless, "NO", the method cycles back to step 120. Step 120 to may be a process from the operating system which detects whether the cursor is to be moved.

If the mouse is moved, "YES", step 121 determines whether the cursor is within an object area. Additionally, in an embodiment of the present invention, the object areas 104, 105, 106 and 107 are each designated in the program as an object set of Cartesian coordinates, and the cursor location comprises a cursor set of Cartesian coordinates representative of a current location of the cursor. The determining step 121 detects that the cursor location is within one of the predetermined object areas by determining whether the cursor set of Cartesian coordinates is a subset of one of the object sets of Cartesian coordinates.

If the cursor is outside the object area, "NO", step 124 provides the cursor instantaneous speed sensitivity which is directly related to the first preselected velocity setting ($V_1$), and the cursor 108 is moved at the speed dictated by the motion of the mouse and the sensitivity ($V_1$).

If step 121 determines that the cursor 108 is within an object area, such as illustrated in object area 107, "YES", step 130 determines whether a button of the mouse is operated (such as to drag the icon of object area 107). If "YES", step 132 determines whether the object being dragged is in a valid drop area. The determination advantageously employs the existing front-of-screen system which, typically, determines invalid drop areas to prevent the user from dropping an object on another object. If the cursor and object are not in a valid drop area, "NO", sensitivity ($V_1$) is again used in step 124 so that the mouse moves the cursor as though the cursor was outside the object area 107, thereby effectively overriding the second sensitivity of the second preselected velocity setting ($V_2$).

If the mouse button is not operated, "NO" in step 130, the cursor is in the "gravity well" area of the present invention, or if the mouse button is operated and the object is in a valid drop area, "YES" in step 132, step 134 provides the cursor instantaneous speed sensitivity which is directly related to the second preselected velocity setting ($V_2$), and the cursor 108 is moved at the speed dictated by the motion of the mouse and the sensitivity ($V_2$). As described above, the second preselected velocity setting is equal to or slower than the first preselected velocity setting so that movement of the cursor movement interface, or mouse, moves the cursor 108 at a slower rate. Thus, the user may control the movement of the cursor with significantly greater precision to select an object or to drop an object.

The method then cycles back to step 120 to detect whether the mouse is still moving.

Movement of the pointer trail is not shown as a step in the method of FIG. 8, in that, in accordance with the present invention, the pointer trails are displayed at substantially the identical speed as the movement of said cursor outside and within the icon areas.

Figure 9:
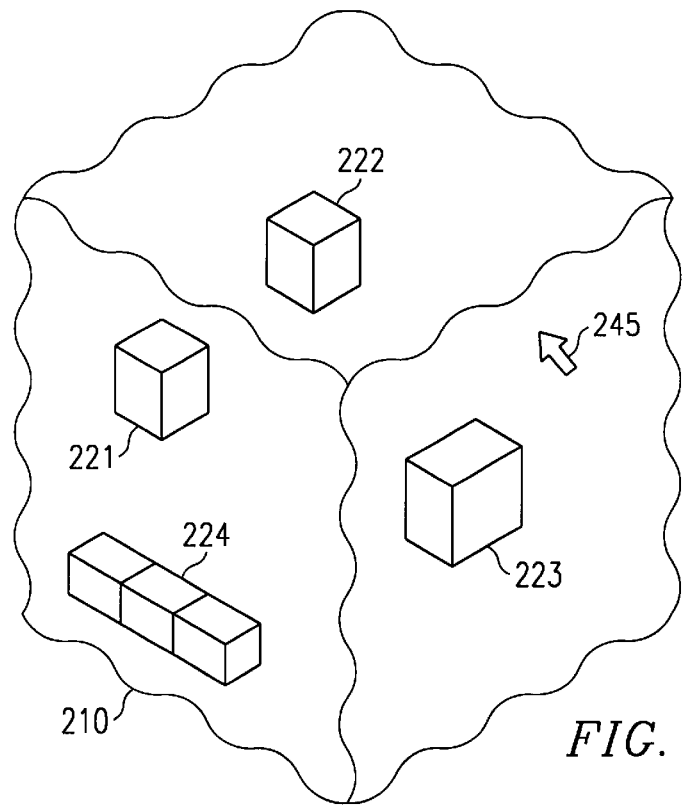
FIG. 9 is a pictorial representation of a GUI front-of-screen depicting three-dimensional object areas.

FIG. 9 depicts a front-of-screen display of a three-dimensional (3-D) space 210, with 3-D GUI objects depicted as cubes 221, 222 and 223, and as a toolbar 224. In one example, the 3-D GUI objects are two-dimensional depictions, and, in another example, such as "Virtual Reality", they are true three-dimensional volume depictions. As indicated above, both examples are defined herein as "object areas". A cursor 245 is moved in accordance with the present invention, at a speed sensitivity directly related to the first preselected velocity setting ($V_1$) when outside one of the predetermined "object areas" or object volumes of cubes 221–223 or toolbar 224, or when a mouse button is operated to drag an object and is within an invalid drop area. The cursor 245, in accordance with the present invention, is moved at a speed sensitivity directly related to the second preselected velocity setting ($V_2$) when within one of the predetermined object areas 221–224, or when a mouse button is operated to drag an object and is in a valid drop areas.

Thus, the present invention is applicable to any front-of-screen display having predetermined object areas, including two-dimensional areas or three-dimensional volumes.

One of skill in the art may make modifications in the ordering of the steps of the method depicted in FIG. 8 and in the use of the operating system process of the computer for accomplishing individual steps, without departing from the scope of the present invention.

While the preferred embodiments of the present invention have been illustrated in detail, it should be apparent that modifications and adaptations to those embodiments may occur to one skilled in the art without departing from the scope of the present invention as set forth in the following claims.

We claim:

1. In a computer system having a display for displaying objects and for displaying a cursor, said objects occupying predetermined object areas of said display, and having a cursor movement interface for controlling movement of said displayed cursor, wherein said cursor movement interface is provided with one or more buttons, a graphical method for controlling movement of said displayed cursor at said display in response to said cursor movement interface, comprising the steps of:

providing a first preselected velocity setting for said cursor;

providing a second preselected velocity setting for said cursor;

determining whether said cursor is located within one of said predetermined object areas of said display;

responding to said cursor movement interface and to said determining step to move said cursor at said display at a speed sensitivity with respect to said cursor movement interface, 1) if said cursor is located outside one of said predetermined object areas, directly related to said first preselected velocity setting, and, 2) if said cursor is located within one of said predetermined object areas, directly related to said second preselected velocity setting; and responding to operation of one of said one or more buttons to determine whether said object is located within an invalid drop area, and, if within an invalid drop area, to override said second preselected velocity setting and to move said cursor at said speed sensitivity directly related to said first preselected velocity setting.

2. In a computer system having a display for displaying objects and for displaying a cursor, said objects occupying predetermined object areas of said display, and having a cursor movement interface for controlling movement of said displayed cursor, a graphical method for controlling movement of said displayed cursor at said display in response to said cursor movement interface, wherein said computer system is arranged to selectively allow said cursor to drag one of said objects, comprising the steps of:

providing a first preselected velocity setting for said cursor;

providing a second preselected velocity setting for said cursor;

determining whether said cursor is located within one of said predetermined object areas of said display;

responding to said cursor movement interface and to said determining step to move said cursor at said display at a speed sensitivity with respect to said cursor movement interface, 1) if said cursor is located outside one of said predetermined object areas, directly related to said first preselected velocity setting, and, 2) if said cursor is located within one of said predetermined object areas, directly related to said second preselected velocity setting; and responding to said drag operation of said cursor to determine whether said object is located within an invalid drop area, and, if within an invalid drop area, to override said second preselected velocity setting and to move said cursor at said speed sensitivity directly related to said first preselected velocity setting.

3. A front-of-screen graphical display system comprising:

a graphical display for displaying objects and for displaying a cursor, said objects occupying predetermined object areas of said display;

a cursor movement interface for controlling movement of said displayed cursor, wherein said cursor movement interface is provided with one or more buttons; and a cursor speed control responding to said cursor movement interface, to first and second preselected velocity settings for said cursor, and to the location at said graphical display of said cursor with respect to said predetermined object areas, to move said cursor at said display at a speed sensitivity with respect to said cursor movement interface, 1) if said cursor is located outside one of said predetermined object areas, directly related to said first preselected velocity setting, and, 2) if said cursor is located within one of said predetermined object areas, directly related to said second preselected velocity setting, wherein said cursor speed control responds to operation of one of said one or more buttons to determine whether said object is located within an invalid drop area, and, if within an invalid drop area, to override said second preselected velocity setting and to move said cursor at said speed sensitivity directly related to said first preselected velocity setting.

4. A front-of-screen graphical display system comprising:

a graphical display for displaying objects and for displaying a cursor, said objects occupying predetermined object areas of said display, wherein said graphical display is arranged to selectively allow said cursor movement interface to drag one of said objects with said cursor;

a cursor movement interface for controlling movement of said displayed cursor; and a cursor speed control responding to said cursor movement interface, to first and second preselected velocity settings for said cursor, and to the location at said graphical display of said cursor with respect to said predetermined object areas, to move said cursor at said display at a speed sensitivity with respect to said cursor movement interface, 1) if said cursor is located outside one of said predetermined object areas, directly related to said first preselected velocity setting, and, 2) if said cursor is located within one of said predetermined object areas, directly related to said second preselected velocity setting, wherein said cursor speed control responds to said drag operation to determine whether said object is located within an invalid drop area, and, if within an invalid drop area, to override said second preselected velocity setting and to move said cursor at said speed sensitivity directly related to said first preselected velocity setting.

5. A computer program product usable with a programmable computer processor having computer readable program code embodied therein for controlling the display of objects and the display of a cursor on a graphical display screen coupled to said computer processor, said objects occupying predetermined object areas of said display, said display of a cursor conducted in response to a cursor movement interface coupled to said computer processor, wherein said coupled cursor movement interface is provided with one or more buttons, comprising:

computer readable program code which causes said programmable computer processor to provide a first preselected velocity setting for said cursor;

computer readable program code which causes said programmable computer processor to provide a second preselected velocity setting for said cursor;

computer readable program code which causes said programmable computer processor to determine whether said cursor is located within one of said predetermined object areas of said display;

computer readable program code which causes said programmable computer processor to respond to said cursor movement interface and to said determining step to move said cursor at said display at a speed sensitivity with respect to said cursor movement interface, 1) if said cursor is located outside one of said predetermined object areas, directly related to said first preselected velocity setting, and, 2) if said cursor is located within one of said predetermined object areas, directly related to said second preselected velocity setting; and computer readable program code which causes said programmable computer processor to respond to operation of one of said one or more buttons to determine whether said object is located within an invalid drop area, and, if within an invalid drop area, to override said second preselected velocity setting and to move said cursor at said speed sensitivity directly related to said first preselected velocity setting.

6. A computer program product usable with a programmable computer processor having computer readable program code embodied therein for controlling the display of objects and the display of a cursor on a graphical display screen coupled to said computer processor, said objects occupying predetermined object areas of said display, said display of a cursor conducted in response to a cursor movement interface coupled to said computer processor, wherein said computer processor selectively allows said cursor to drag one of said objects, comprising:

computer readable program code which causes said programmable computer processor to provide a first preselected velocity setting for said cursor;

computer readable program code which causes said programmable computer processor to provide a second preselected velocity setting for said cursor;

computer readable program code which causes said programmable computer processor to determine whether said cursor is located within one of said predetermined object areas of said display;

computer readable program code which causes said programmable computer processor to respond to said cursor movement interface and to said determining step to move said cursor at said display at a speed sensitivity with respect to said cursor movement interface, 1) if said cursor is located outside one of said predetermined object areas, directly related to said first preselected velocity setting, and, 2) if said cursor is located within one of said predetermined object areas, directly related to said second preselected velocity setting; and computer readable program code which causes said programmable computer processor to determine whether said object is located within an invalid drop area, and, if within an invalid drop area, to respond to said drag operation of said cursor to override said second preselected velocity setting and to move said cursor at said speed sensitivity directly related to said first preselected velocity setting.

\* \* \* \* \*